United States Patent [19]

Burstain

[11] Patent Number: 5,134,208

[45] Date of Patent: Jul. 28, 1992

[54] POLYMERIZATION PROCESS

[75] Inventor: Israel G. Burstain, Houston, Tex.

[73] Assignee: Shell Oil Company, Houston, Tex.

[21] Appl. No.: 766,257

[22] Filed: Sep. 27, 1991

[51] Int. Cl.$^5$ ................................................ C08F 2/34
[52] U.S. Cl. ........................................ 526/68; 526/67; 526/69; 526/351
[58] Field of Search ................................ 526/67, 68

[56] References Cited

U.S. PATENT DOCUMENTS

| | | | |
|---|---|---|---|
| 4,851,488 | 7/1989 | Burstain | 526/78 |
| 4,881,953 | 11/1989 | Prasad et al. | 55/16 |
| 4,919,865 | 4/1990 | Nelson | 264/45 |
| 4,990,165 | 2/1991 | Bikson et al. | 55/158 |
| 4,994,095 | 2/1991 | Kawakami et al. | 55/16 |

OTHER PUBLICATIONS

Kirk-Othmer, Encyclopedia of Chemical Technology, 3rd. Ed., vol. 12, pp. 772-180.

Primary Examiner—Joseph L. Schofer
Assistant Examiner—David Wu

[57] ABSTRACT

In an ongoing process for the production of polypropylene polymer, propylene monomer is contacted with a polypropylene polymerization catalyst under polymerization conditions in the presence of molecular hydrogen to control polymer molecular weight and polymer properties such as melt flow. Production of polymer having increased or decreased melt flow is achieved by contacting at least a portion of the recycle gas with a metal hydride or metal hydride precursor under conditions whereby the hydrogen concentration of the recycle gas and thus the polymerization reactor is increased or decreased, respectively. The increase or decrease in hydrogen concentration in the polymerization reactor results in production of polypropylene polymer product of higher or lower melt flow.

6 Claims, No Drawings

POLYMERIZATION PROCESS

FIELD OF THE INVENTION

This invention relates to an improved process for the production of polypropylene. More particularly, the invention relates to a propylene polymerization process wherein the quantity of molecular hydrogen normally present in such a process is controlled through utilization within the polymerization system of a metal hydride or precursor thereof.

BACKGROUND OF THE INVENTION

The class of metal hydrides is well known in the art, being discussed in some detail in Kirk-Othmer, Encyclopedia of Chemical Technology, 3rd. Ed., Vol. 12, pp. 772-780. Such metal hydrides contain the element hydrogen in an electronegative state and are simple binary hydrides or are more complex. Many of the hydrides are formed by direct reaction of hydrogen and the metal or metals to be present in the hydride. In most cases, this reaction is reversible and the hydrides decompose at a more elevated temperature to regenerate elemental hydrogen. Because of these reversible reactions, a number of metals or metal alloys are useful for the storage of large volumes of hydrogen through hydride formation, which hydrogen can be released upon heating of the hydride. See, for example, the above Kirk-Othmer reference at page 779. Hydrogen-storage alloys are commercially available and have potential in solar-heating systems, nonpolluting internal combustion engines and electric utility peak-load shaving applications.

In the process of polymerizing propylene to produce polypropylene, molecular hydrogen is frequently and conventionally added to control the extent of polymerization. The proportion of hydrogen present serves to control the molecular weight of the polypropylene product which is often measured by the melt flow of the polymer expressed in dl/g. To change the melt flow and thus the molecular weight of the polypropylene product from one value to a higher value, hydrogen is typically added. To obtain polypropylene of lower melt flow a portion of the hydrogen present is removed as by reactor venting.

During ongoing commercial polypropylene production it is necessary from time to time to change the melt flow of the polymer in order to meet the specifications of polymer designed for particular applications. These changes, accomplished through modification of the proportion of molecular hydrogen present in the polymerization reactor, are costly. The lowering of melt flow typically requires the venting of hydrogen and accompanying loss of relatively large quantities of unreacted propylene monomer. In order to raise the melt flow of the polymer it is required to add hydrogen which also becomes expensive. In Burstain, U.S. Pat. No. 4,851,488, the melt flow of the polymer is reduced by consuming some of the hydrogen present through hydrogenation of unreacted monomer. Such a process cannot, of course, be used to increase polypropylene melt flow. It would be of advantage to provide a method for the control of hydrogen concentration in a polypropylene process which avoids the costs associated with the loss/replacement of hydrogen during designed changes in melt flow of a polypropylene polymer product.

SUMMARY OF THE INVENTION

The present invention provides an improved propylene polymerization process. More particularly, the present invention provides for efficient hydrogen utilization in such an ongoing polymerization process where polypropylene polymers of differing melt flow are produced. The process of the invention provides for the inclusion within the polymerization system of metal hydrides or metal hydride precursors to serve as a means of providing or storing molecular hydrogen as required during ongoing production of polypropylene polymers of differing melt flows.

DESCRIPTION OF THE INVENTION

The present invention contemplates the provision within an otherwise conventional propylene polymerization system of at least one metal hydride or metal hydride precursor to serve as a control of molecular hydrogen concentration when changes in the molecular hydrogen concentration are desired during propylene polymerization. The process employs a conventional propylene polymerization catalyst, particularly one of the recent high activity, stereoregular polymerization catalysts and affords polypropylene of good quality. However, during the intended changes in the properties of the polypropylene, particularly melt flow, which are normally encountered over time during commercial polypropylene production, the process provides substantial economic savings by avoiding loss of molecular hydrogen and unreacted propylene monomer whenever it is desired to produce polypropylene of lower melt flow than that produced previously. Alternatively, when production of polypropylene of higher melt flow than that previously produced is desired, the present process avoids the expense of molecular hydrogen normally added to the reaction system.

The propylene polymerization catalyst is preferably a high activity, steroregular polymerization catalyst. In terms conventionally employed to describe such catalysts, the stereoregular catalysts of high activity contain a procatalyst which is usually a titanium halide-containing solid and often a magnesium halide, and which customarily contains an electron donor. Suitable electron donors for use in the catalysts of the invention include ethers, esters, nitriles, phosphines, phosphites, stibines, arsines, phosphoramides, alcoholates and silanes which are employed singly or in combination. The preferred electron donors are esters, particularly alkyl esters of aromatic carboxylic acids, e.g., ethyl benzoate or diisobutyl phthalate.

The second catalyst constituent, conventionally termed a cocatalyst, is an organoaluminum compound which is often a trialkylaluminum such as triethylaluminum or tributylaluminum, or alternatively is an alkylaluminum halide including dialkylaluminum chlorides such as diethylaluminum chloride and dipropylaluminum chloride. In yet another modification, dialkylaluminum alkoxides such as diethylaluminum ethoxide or dibutylaluminum propoxide are employed. Trialkylaluminum compounds are preferred and particularly preferred is triethylaluminum. The cocatalyst is provided as such or as a partial or total complex with a third component which is termed a selectivity control agent. Conventional selectivity control agents are illustrated by esters, particularly aromatic esters, amines, particularly hindered amines, phosphites, phosphates, silanes including alkylalkoxysilanes and arylalkoxysilanes, hindered phenols and mixtures thereof. The preferred selectivity control agents are alkyl esters of aromatic carboxylic acids, e.g., ethyl p-ethylbenzoic acid, ethyl p-methylbenzoic acid and diisobutyl phthlate, or alkoxysilanes such as diisobutyldimethoxysilane or diphenyldimethoxysilane.

These high activity stereoregular propylene polymerization catalysts are described in numerous patents and other references including Nestlerode et al, U.S. Pat. No. 4,728,705. Although a variety of chemical compounds are useful as constituents of the catalysts, a typical stereoregular polymerization catalyst often contains as a procatalyst a solid constituent comprising a magnesium halide, a tetravalent titanium halide and an electron donor as described above. The halide moieties of such procatalysts are often chloride. The cocatalyst is the trialkylaluminum which is often at least partially complexed with the selectivity control agent. Use of this type of catalyst in propylene polymerization is conventional and well known in the art and results in the production of a polypropylene polymer which is predominantly stereoregular and often predominantly isotactic. Many of the catalysts are sufficiently active to cause the formation of polymers of desirable properties as produced without the necessity of removing catalyst residues in a deashing step.

The catalysts are illustratively formed by reacting a magnesium compound, e.g., a magnesium alkoxide such as magnesium ethoxide, with a tetravalent titanium halide such as titanium tetrachloride in the presence of the electron donor and optionally in the presence of a halohydrocarbon reaction diluent. The resulting solid is optionally treated with additional tetravalent titanium halide and is then washed, with light hydrocarbon for example, to remove unreacted titanium compounds. The solid procatalyst is then contacted with the cocatalyst and the selectivity control agent.

The catalysts are used in established and well known processes to produce polypropylene polymer. The processes are suitably gas-phase in the substantial absence of reaction diluent or alternatively are liquid-phase in the presence of an inert diluent such as propane or a liquified polymerizable monomer such as liquified propylene. The polymerization process may suitably be batchwise, continuous or semi-continuous and is accomplished by contacting the propylene monomer to be polymerized and the polymerization catalyst under polymerization conditions. Typical polymerization conditions include a polymerization temperature from about 30° C. to about 120° C., preferably from about 45° C. to about 90° C., and a pressure from about 2 atmospheres to about 40 atmospheres depending in part upon whether the process is conducted in a gas phase or a liquid phase manner. Liquid phase polymerization pressures are preferably from about 20 atmospheres to about 30 atmospheres whereas gas-phase processes are often conducted at a pressure from about 10 atmospheres to about 40 atmospheres. The precise methods of conducting the polymerization and the control of reaction conditions are within the skill and knowledge of the art and unreacted product mixture components such as unreacted monomer, any reaction diluent and molecular hydrogen are typically separated from the polypropylene product in a separation portion of the polymerization system and recycled to the polymerization reactor.

It is useful on some occasions to include within the polymerization mixture and thus within the polymer product a small amount, e.g., up to about 6% by weight based on total polymer, of some other alpha-monoolefin such as ethylene, 1-butene or 4-methyl-1-pentene to modify the properties of the resulting polymer product. Such polymers, although technically copolymers, are included within the conventional meaning of polypropylene. In the preferred embodiments of the process of the invention the olefin feed to the reactor and the polymer product will be substantially free of alpha-monoolefin other than propylene.

It is also well known as stated above to include molecular hydrogen in the polymerization mixture to control the molecular weight of the polymer product and thus determine many of the properties of the polymer such as melt flow. In commercial, ongoing polypropylene production processes the melt flow of the polymer product is intentionally changed from time to time in order to produce various polypropylene polymers having specified properties in order to be suitable for particular applications. For example, polypropylene of relatively high melt flow is produced whenever polypropylene polymer for non-woven fabric is desired. Alternatively, polypropylene of relatively low melt flow is desired for applications such as thermoforming or injection molding. In commercial operation it is desirable to minimize any "down time" and rapid changes are desirable during an intentional change in product properties. In conventional propylene polymerization processes, the effective lowering of melt flow is typically accomplished by rapid venting from the polymerization system of molecular hydrogen. This venting procedure serves to lower the hydrogen concentration in the polymerization reactor and thus the melt flow of the resulting polypropylene, but is accompanied by considerably loss of propylene monomer. To conventionally increase the melt flow of the polypropylene product, molecular hydrogen is added to the polymerization reactor, often at substantial cost.

In the improved propylene polymerization process of the invention, however, provision is made within the reaction system for the inclusion of a metal hydride, a metal hydride precursor or mixtures thereof. By contacting a portion of the normally vented, hydrogen-containing reactor gas and a metal hydride precursor under hydride-forming conditions, hydrogen is effectively removed from the reaction system through metal hydride formation and the propylene component of the reactor gas, normally also vented, is available for polymerization. Such hydrogen removal results in a lower concentration of hydrogen in the polymerization reactor and a lowering of melt flow of the reactor product. Alternatively, when an increase in hydrogen concentration in the polymerization reactor and the resulting increase in polymerization product melt flow is desired, the metal hydride is heated to hydride-decomposition conditions and the molecular hydrogen thereby released is passed to the polymerization reactor. Thus, the metal hydride/metal hydride precursor serves as a reservoir for hydrogen when a lowering of the hydrogen concentration is desired or a source of hydrogen to effect an increase in hydrogen concentration. The conventional venting of hydrogen and/or hydrogen from external sources is therefore reduced or eliminated in an ongoing process for producing polypropylene polymer of variable melt flow. In practice, it is preferred to provide to the reaction system a mixture of metal hydride and metal hydride precursor, i.e., the metal or metals from which metal hydride is formed, so that reaction with or release of molecular hydrogen can be accomplished as needed.

The metal hydrides that are useful in the process of the invention are those formed through reaction of the metal hydride precursor with relatively high proportions of hydrogen but which decompose to release that hydrogen at relatively low temperatures. Metals that are useful as metal hydride precursors in the production of metal hydrides of the invention are suitably alkaline earth metals, e.g., magnesium or calcium, transition metals and particularly non-noble transition metals, e.g., iron or nickel, rare earth metals such as lanthanum or uranium, or mixtures (alloys) thereof. Single metals such as those listed above are satisfactory but better results are often obtained through the use of metal alloys or the hydrides of metal alloys. One class of such alloys are iron/titanium alloys of approximately equal atomic proportions which may optionally additionally contain rare earth metal, nickel or manganese. Such alloys form metal hydrides which decompose to release hydrogen at relatively low temperatures. A second class of generally useful alloys is of the general formula $AB_5$ wherein A is a rare earth metal (including actenides) or calcium and B is cobalt or nickel. The alloy of this formula wherein A is lanthanum and B is nickel is particularly preferred. Magnesium alloys with titanium and zinc or nickel are also particularly useful because of the relatively high hydrogen storage capacity of the hydrides which these alloys form.

The metal hydride or metal hydride precursor is provided to the polymerization system at any convenient location where the hydride or hydride precursor will contact circulating reactor components or unreacted product mixture materials from which hydrogen can be removed or to which hydrogen is provided. It is possible, although not preferred, to incorporate the metal hydride or metal hydride precursor within the polymerization reactor or in the separation zone in which polymer product is separated from unreacted polypropylene, any reaction diluent and any other reaction mixture components. In the preferred modification of the process of the invention, the metal hydride or metal hydride precursor is provided in a side loop as in a recycle loop in which unreacted monomer and other unreacted product mixture components are returned to the polymerization reactor from the product separation zone. Such a location enables the conditions and particularly the temperature at which the metal hydride or metal hydride precursor is contacted with hydrogen-rich or hydrogen-lean reactor feed to be more closely controlled. Such conditions are therefore variable independently from the conditions of the polymerization reactor. In the ongoing operation of a propylene polymerization process when it is desired to alter operation of the process to produce polypropylene product of a lower melt flow than that product previously produced, a stream from the reactor or product separation zone is routed through a side loop where the stream contacts metal hydride precursor under conditions at which the precursor will react with the hydrogen of the recycle stream to produce metal hydride. Such hydride-forming conditions will vary depending in part upon the particular metal of the hydride precursor but such conditions are conventional and well known. Typical hydride-forming conditions, however, include a temperature from about 50° C. to about 800° C. and a partial pressure of hydrogen from about 0.1 atmospheres to about 50 atmospheres. During passage through this loop at least a portion of the hydrogen present in the recycle stream will be removed through hydride formation and upon return to the polymerization reactor the hydrogen concentration of the reaction mixture will be reduced. The melt flow of the polymer product produced therefrom will also be reduced.

In the alternate embodiment of the process of the invention where alteration of the polymerization process to produce polymer product of increased melt flow is desired, passage of a recycle stream through a side loop containing metal hydride under conditions whereby the metal hydride decomposes to produce hydrogen results in a stream returning to the reactor in which the hydrogen concentration has been increased. Upon passage of this stream to the reactor, the hydrogen concentration of the reactor is also increased and the melt flow of the resulting polypropylene polymer will be higher. The particular hydride-decomposition conditions under which the metal hydride will decompose to release hydrogen will vary depending upon the particular metal hydride. However, such conditions are also well known and conventional in the art. Typical conditions for release of hydrogen from metal hydrides include a temperature from about 50° C. to about 800° C. and a hydrogen partial pressure from about 0.1 atmospheres to about 50 atmospheres.

Better efficiency of the hydrogen removal/provision process is obtained if means are employed to minimize the contact of the recycle reaction mixture components other than hydrogen with the metal hydride or metal hydride precursor. For example, it is desirable to minimize the contact of the metal hydride or metal hydride with the propylene component of such a recycle stream. Such separation of propylene and metal hydride or metal hydride precursor is most easily accomplished by utilization of a membrane or other porous barrier that will permit passage of molecular hydrogen but not permit the passage of propylene or other reaction mixture components. The use of membranes for such a general purpose is known in the art from, for example, Nelson, U.S. Pat. No. 4,919,865, and Bikson, U.S. Pat. No. 4,990,165. However, typical membranes are polyesters, polysulfones or polyacrylate-type materials. Containing the metal hydride or metal hydride precursor in such a membrane ensures free passage of hydrogen to or from the hydride or hydride precursor but does not permit the passage of hydrocarbon materials including propylene. The identity of such suitable selective membranes is known from the above Nelson and Bickson references as well as from U.S. Pat. Nos. 4,994,095 and 4,881,953. The conditions of temperature and pressure required for passage through such a membrane are also known and in general are within the conditions required for the metal hydride precursor to react with hydrogen or alternatively for a metal hydride to liberate hydrogen.

The process of the invention therefore comprises an improved propylene polymerization process whereby modifications of an ongoing propylene polymerization are made to facilitate the change from production of polypropylene of one melt flow to polypropylene of higher or lower melt flow while conserving the molecular hydrogen employed for control of polypropylene polymer molecular weight and thus melt flow.

The invention is further illustrated by the following Comparative Illustration (not of the invention) and the Illustrative Embodiment which should not be regarded as limiting the invention.

COMPARATIVE ILLUSTRATION

In a continuous, ongoing gas-phase process for the production of a first polypropylene polymer product, a concentration of molecular hydrogen is provided to the polymerization reactor to control the molecular weight of the polypropylene product and thus the properties of the polymer such as melt flow. When it is desired to produce a second polypropylene polymer product of lower melt flow without a shut-down of the polymerization process, a portion of the molecular hydrogen is vented from the polymerization system. The venting of hydrogen necessarily includes considerable loss of propylene monomer. The lower concentration of hydrogen in the polymerization system including the polymerization reactor results in production of the second polypropylene polymer with a lower melt flow than that of the first polypropylene polymer.

When production of polypropylene polymer having a higher melt flow than that of the second polypropylene polymer is desired without halting the polypropylene production, molecular hydrogen is added to the polymerization system. An increase in the molecular hydrogen concentration in the polymerization system including the polymerization reactor results in production of polypropylene polymer of higher melt flow.

ILLUSTRATIVE EMBODIMENT

In a continuous, ongoing gas-phase process for the production of a first polypropylene polymer product, a concentration of molecular hydrogen is provided to the polymerization reactor to control the molecular weight of the polypropylene polymer product and thus the properties of the polymer such as melt flow. When it is desired to produce a second polypropylene polymer product of lower melt flow without a shut-down of the polymerization process, a portion of the recycle gas which passes from a separation zone, wherein unreacted product mixture components are separated from the polypropylene product, back to the polymerization reactor is contacted with a magnesium/titanium alloy under conditions of temperature and pressure sufficient to cause the alloy to react with at least a portion of the molecular hydrogen present in the recycle gas and thereby form metal hydride. The resulting lowering of the molecular hydrogen in the recylce gas will cause a lowering of the hydrogen concentration in the polymerization reactor and the consequent production of a second polypropylene polymer having a melt flow lower than that of the first polypropylene polymer.

When production of polypropylene polymer having a higher melt flow than that of the second polypropylene polymer is desired without halting polypropylene production, at least a portion of the recycle gas contacts magnesium/titanium hydride under conditions whereby the hydride produces molecular hydrogen and thereby increases the hydrogen concentration of the recycle gas. This increase will result in an increase in the hydrogen concentration in the polymerization reactor and the resulting polypropylene polymer product will have a melt flow higher than that of the second polypropylene polymer.

What is claimed is:

1. In the ongoing process of polymerizing propylene by contacting propylene with a polypropylene polymerization catalyst under polymerization conditions in the presence of molecular hydrogen wherein unreacted product mixture components are separated from the polypropylene polymer product and returned to the polymerization reactor, the improvement of contacting at least a portion of the returning unreacted product mixture components with a metal hydride or a metal hydride precursor, thereby altering the molecular hydrogen concentration of the returning product mixture components and, upon return of the components to the polymerization reactor, the molecular hydrogen concentration in the polymerization reactor, thereby obtaining a polypropylene product of differing melt flow.

2. The process of claim 1 wherein the metal of the metal hydride or metal hydride precursor is an alkaline earth metal, a transition metal or a rare earth metal, or mixtures thereof.

3. The process of claim 2 wherein the metal is an iron/titanium alloy optionally containing rare earth metal, nickel or manganese, an alloy of the formula $AB_5$ wherein A is rare earth metal or calcium and B is cobalt or nickel, or alloys of titanium and zinc or nickel.

4. The process of claim 3 wherein the returning unreacted product mixture components are contacted with a metal hydride under metal hydride decomposition conditions, thereby increasing the hydrogen concentration of the returning unreacted product mixture components and the hydrogen concentration in the polymerization reactor, and recovering from the resulting product mixture polypropylene of higher melt flow.

5. The process of claim 3 wherein the returning unreacted product mixture components are contacted with a metal hydride precursor under hydride-forming conditions, thereby reducing the hydrogen concentration of the returning unreacted product mixture components and the hydrogen concentration in the polymerization reactor, and recovering from the resulting product mixture polypropylene of lower melt flow.

6. The process of claim 3 wherein the metal hydride or metal hydride precursor is enclosed by a porous barrier through which hydrogen but not other product mixture components can pass.

* * * * *